A. MINNICK.
SAFETY AUTO CONTROL.
APPLICATION FILED JAN. 22, 1919.
1,418,601.
Patented June 6, 1922.
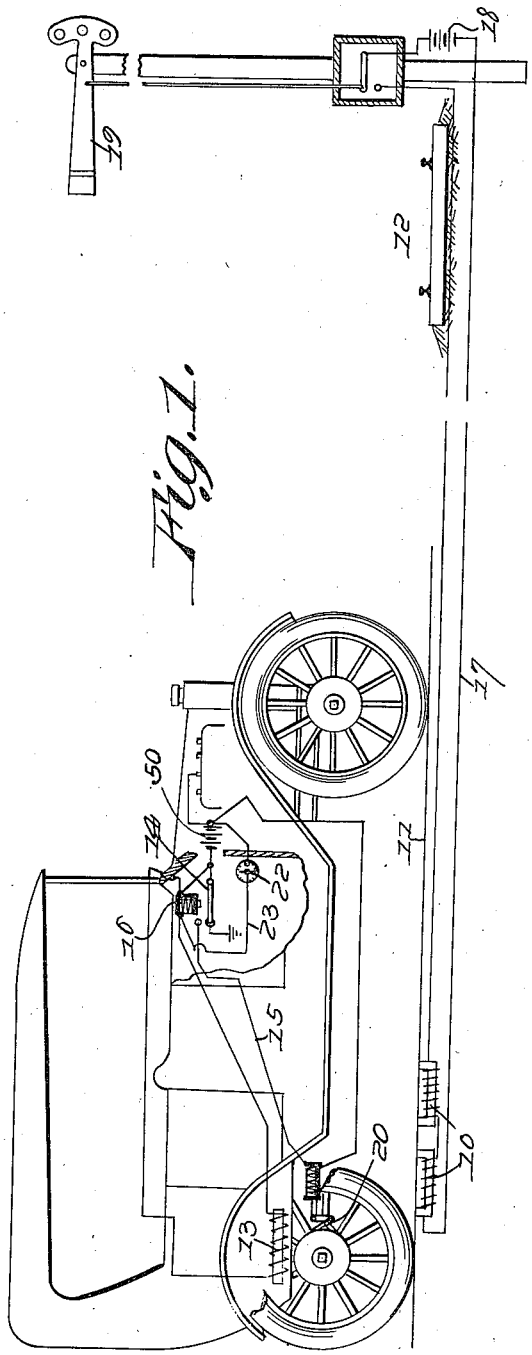
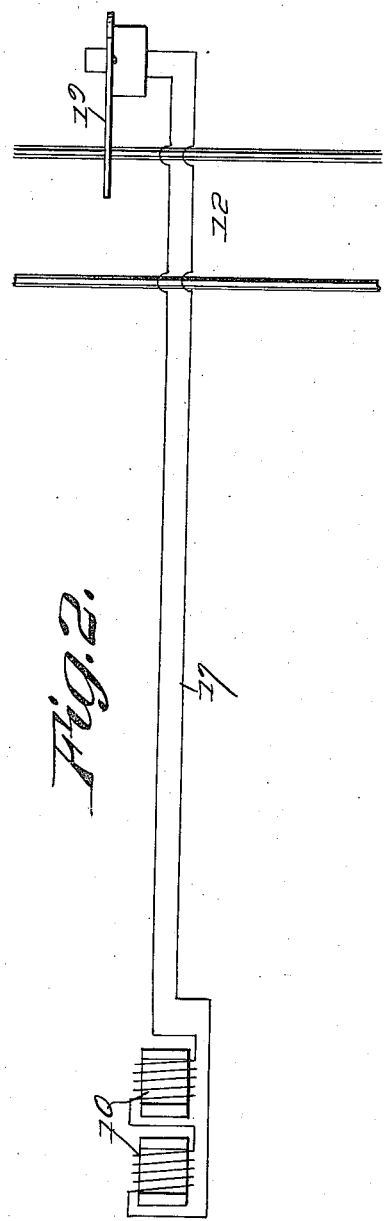
Inventor
Alfred Minnick,
By
Attorney

UNITED STATES PATENT OFFICE.

ALFRED MINNICK, OF NEWARK, NEW JERSEY, ASSIGNOR TO M-V. ALL WEATHER TRAIN CONTROLLER COMPANY, OF WILMINGTON, DELAWARE, A CORPORATION OF DELAWARE.

SAFETY AUTO CONTROL.

1,418,601.     Specification of Letters Patent.     Patented June 6, 1922.

Application filed January 22, 1919. Serial No. 272,552.

*To all whom it may concern:*

Be it known that I, ALFRED MINNICK, a citizen of the United States, and resident of Newark, county of Essex, and State of New Jersey, have invented a new and useful Improvement in Safety Auto Controls, of which the following is a specification.

The object of the invention is to provide means for safe-guarding motor driven vehicles at railway grade crossings and on approaches to bridges, dangerous curves or grades, under such conditions as to insure discontinuance of the operation of the ignition devices or the application of equivalent or related restraining influences in time to check the progress of the vehicle within a safety zone and incidentally to warn the operator to adopt precautionary measures.

An illustrative embodiment of the invention is disclosed in the accompanying drawing wherein, Figure 1 is a side view of a vehicle and roadbed equipment;

Figure 2 is a plan view of the road-bed equipment;

The apparatus consists of an induction or electro-magnetic element and coil 10 buried in the roadbed of a road 11, where the road approaches a railroad crossing 12, or other periodical source of danger.

An iron core surrounded by a coil 13 is supported upon the vehicle and when it travels over the coil 10 a current is induced in the coil 13, if the coil 10 is at that moment alive.

Coil 13 is in a closed circuit with the winding of a vehicle carried electro-magnetic switch 16, which has a movable armature and contact blade 14, shown in the de-energized and down position. In this position the conventional ignition circuit of the vehicle engine is normal and closed.

When the magnetic influence generated by the coil 10 induces a current in coil 13, this current also flows through the winding 16, and lifts armature and contact blade 14, which breaks the normal ignition circuit of the vehicle engine.

When the armature 14 is thus lifted into the up position a circuit 15 is established from the vehicle carried battery 50, which applies an electric brake 20 to the rear wheels of the vehicle.

The circuit 17 in which the road or primary coils are included, it being understood that any desired number thereof may be employed to accomplish the desired result at any speed of approach of a car equipped with the apparatus, may receive its current from any suitable source 18 and may be closed to include the coils and said source by means of a semaphore 19 actuated in the ordinary or any preferred manner.

Also, obviously the equipment may be arranged so as to merely give a signal or warning to the driver of the approach to a danger zone, but the arrangement herein suggested by which the progress of the vehicle is affected is positive and acts not only as a warning but a definite check to the vehicle, especially should a brake applying connection be associated therewith, as indicated, at 20, should the attention of the driver be diverted or divided for any reason, and the location of the road coils may be at such a distance from the crossing or danger zone to provide for bringing the vehicle to a stop or a safe speed of progress before reaching the point which is guarded.

Moreover, associated with the above-described mechanism there may be provided a circuit breaker, such as that shown at 16, actuated by a speedometer 22 and included in a relay circuit 23 for breaking the ignition circuit when the rate of travel exceeds that which is regarded as within the bounds of safety.

What is claimed is:—

1. A system of safety control for vehicles of the explosion motor driven type, having primary and secondary induction coils, the former of which is arranged in the road-bed and the other on the vehicle, the primary coil being in circuit with a source of energy including a semaphore actuated switch, and the ignition circuit of the vehicle motor including a switch actuable by fluctuations in the secondary circuit.

2. A system of safety control for vehicles of the explosion motor driven type, having primary and secondary induction coils, the former of which is arranged in the road bed and the other on the vehicle, the primary coil being in circuit with a source of energy including a semaphore actuated switch, and the secondary coil being included in a circuit also including means for opening the motor ignition circuit.

In testimony whereof I affix my signature.

ALFRED MINNICK.